United States Patent
Yang

(10) Patent No.: US 12,382,324 B2
(45) Date of Patent: Aug. 5, 2025

(54) NETWORK DATA COLLECTION METHOD

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 401 days.

(21) Appl. No.: 18/072,339

(22) Filed: Nov. 30, 2022

(65) Prior Publication Data

US 2023/0133309 A1 May 4, 2023

Related U.S. Application Data

(63) Continuation of application No. PCT/CN2020/100909, filed on Jul. 8, 2020.

(51) Int. Cl.
*H04W 24/08* (2009.01)
*H04W 68/00* (2009.01)

(52) U.S. Cl.
CPC ......... *H04W 24/08* (2013.01); *H04W 68/005* (2013.01)

(58) Field of Classification Search
CPC ..... H04W 24/08; H04W 24/10; H04W 24/02; H04W 68/005; H04W 68/00; H04W 48/12
See application file for complete search history.

(56) References Cited

U.S. PATENT DOCUMENTS

| 2015/0289157 A1 | 10/2015 | Lundqvist et al. |
| 2021/0058812 A1* | 2/2021 | Chai ............... H04W 72/21 |

FOREIGN PATENT DOCUMENTS

| CN | 103580794 A | | 2/2014 | |
| CN | 104105114 A | | 10/2014 | |
| CN | 104519478 A | * | 4/2015 | ............ H04W 24/00 |
| CN | 107872833 A | | 4/2018 | |
| CN | 110691386 A | * | 1/2020 | ............ H04W 28/18 |
| WO | WO-2020063395 A1 | * | 4/2020 | ............ H04L 5/0053 |

OTHER PUBLICATIONS

PCT/CN2020/100909 English translation of International Search Report dated Apr. 9, 2021, 2 pages.

* cited by examiner

*Primary Examiner* — Farid Seyedvosoghi
(74) *Attorney, Agent, or Firm* — Cozen O'Connor

(57) ABSTRACT

A network data collection method is provided. The method includes sending first indication information by a network device; in which the first indication information is configured to indicate a user equipment (UE) to record network data. The UE receives the first indication information sent by a network device; and records network data based on the first indication information.

20 Claims, 3 Drawing Sheets

```
                                                              201
  sending, by a network device, first indication information  /
```

```
                                                                301
  receiving, by a UE, the first indication information sent by the network
                                device                          /
```

```
                                                                302
  recording, by the UE, network data based on the first indication information
                                                                /
```

NETWORK DATA COLLECTION METHOD

CROSS-REFERENCE TO RELATED APPLICATION

This application is a continuation of International Patent Application No. PCT/CN2020/100909, filed on Jul. 8, 2020, the entire contents of which are incorporated herein by reference.

FIELD

This disclosure relates to network data collection technologies, especially to a network data collection method, a network data collection apparatus, a network device, a user equipment (UE) and a storage medium.

BACKGROUND

Network performance directly affects the service quality of a wireless communication network, and then affects the user experience with user equipment connected to the wireless communication network, so the network performance needs to be continuously optimized. At present, network optimization mainly depends on manual debugging, which is laborious. The introduction of artificial intelligence technologies can simplify manual operations and improve the optimization performance.

In the construction of 5G and even future networks, the debugging of network performance needs network data at different moments, and the networks need to be optimized by means of artificial intelligence algorithms, which requires a large amount of global data to support the network optimization. However, at present, it is impossible to obtain the global data of the networks and achieve more optimized network performance.

SUMMARY

In view of this, embodiments of the present disclosure provide a network data collection method, a network data collection apparatus, a network device, a user equipment and a storage medium.

According to a first aspect of embodiments of the present disclosure, there is provided a network data collection method, which includes sending, by a network device, first indication information; in which the first indication information is configured to indicate a user equipment (UE) to record network data.

According to a second aspect of embodiments of the present disclosure, there is provided a network data collection method, which includes receiving, by a UE, first indication information sent by a network device; and recording, by the UE, network data based on the first indication information.

According to a third aspect of embodiments of the present disclosure, there is provided a network device, which includes a processor; a transceiver; a memory; and an executable program stored in the memory and capable of being run by the processor, in which the processor is configured to execute steps of the network data collection method when running the executable program.

BRIEF DESCRIPTION OF THE DRAWINGS

The accompanying drawings herein, which are incorporated in and constitute a part of this specification, illustrate embodiments consistent with the present disclosure and, together with the specification, serve to explain the principles of the embodiments of the present disclosure.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of apparatuses and methods consistent with some aspects of embodiments of the present disclosure as recited in the appended claims.

Terms used herein in embodiments of the present disclosure are only for the purpose of describing specific embodiments, but should not be construed to limit the present disclosure. As used in the embodiments of the present disclosure and the appended claims, "a/an", "said" and "the" in singular forms are intended to include plural forms, unless clearly indicated in the context otherwise. It should also be understood that, the term "and/or" used herein represents and contains any or all possible combinations of one or more associated listed items.

It should be understood that, although terms such as "first," "second" and "third" may be used in embodiments of the present disclosure for describing various information, these information should not be limited by these terms. These terms are only used for distinguishing information of the same type from each other. For example, first information may also be referred to as second information, and similarly, the second information may also be referred to as the first information, without departing from the scope of embodiments of the present disclosure. As used herein, the term "if" may be construed to mean "when" or "upon" or "in response to determining" depending on the context.

Figures 1, 2, 3:
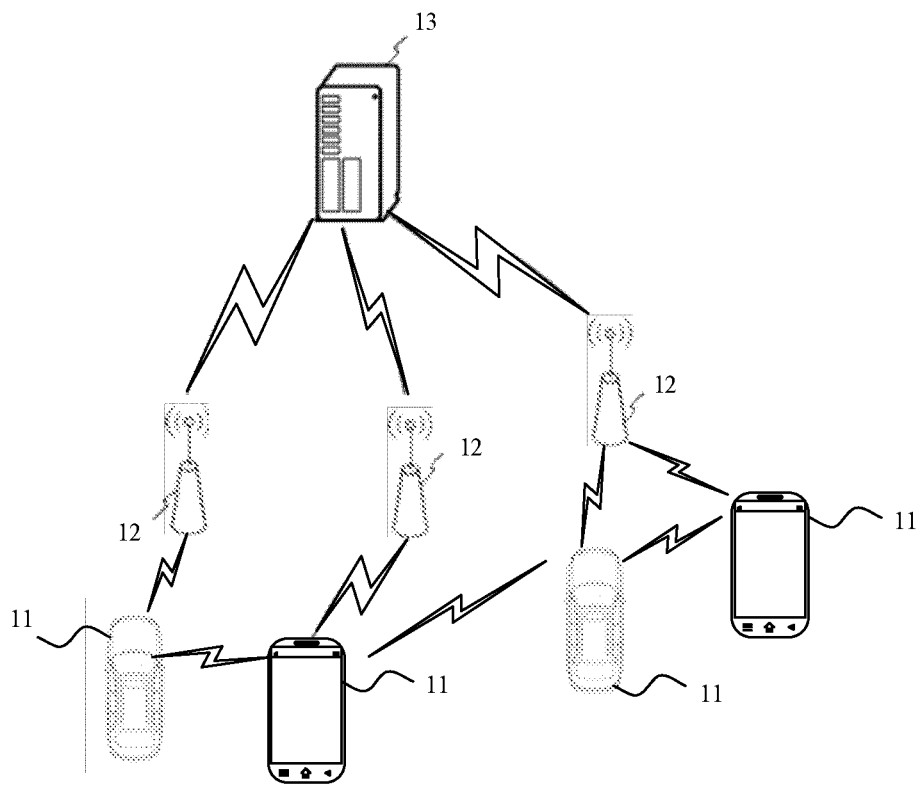
FIG. 1 is a schematic diagram showing a wireless communication system according to an illustrative embodiment.
FIG. 2 is a flow chart showing a network data collection method in a network device according to an illustrative embodiment.
FIG. 3 is a flow chart showing a network data collection method in a user equipment according to an illustrative embodiment.

Referring to FIG. 1, which is a schematic diagram showing a wireless communication system provided by an embodiment of the present disclosure. As shown in FIG. 1, the wireless communication system is a communication system based on a cellular mobile communication technology, and may include several terminals 11 and several base stations 12.

The terminal 11 may be a device that provides voice and/or data connectivity to a user. The terminal 11 can communicate with one or more core networks via a radio access network (RAN). The terminal 11 can be an Internet of Things terminal, such as a sensor device, a mobile phone (or referred to as a "cellular" phone) and a computer with an Internet of Things terminal. For example, it can be a fixed, portable, pocket-sized, handheld, built-in computer or vehicle-mounted apparatus. For example, a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may be a device of an unmanned aerial vehicle. Alternatively, the terminal 11 may be a vehicle-mounted device, for example, a driving computer with a wireless communication function, or a wireless communication device externally connected with a driving computer. Alternatively, the terminal 11 may be a roadside device, such as a street lamp, a signal lamp or other roadside devices with a wireless communication function.

The base station 12 may be a network side device in the wireless communication system. The wireless communication system can be a $4^{th}$ generation mobile communication (4G) system, also referred to as a long term evolution (LTE) system. Alternatively, the wireless communication system may be a 5G system, also referred to as a new radio (NR) system or a 5G NR system. Alternatively, the wireless communication system may be a next generation system of the 5G system. The access network in the 5G system can be referred to as a new generation-radio access network (NG-RAN), or a MTC system.

The base station 12 may be an evolved base station (eNB) used in the 4G system. Alternatively, the base station 12 may be a centralized distributed architecture base station (gNB) used in the 5G system. When the base station 12 adopts the centralized distributed architecture, it usually includes a central unit (CU) and at least two distributed units (DUs). A protocol stack of a packet data convergence protocol (PDCP) layer, a radio link control (RLC) layer and a media access control (MAC) layer is provided in the central unit. A protocol stack of a physical (PHY) layer is provided in the distributed unit. The specific implementation of the base station 12 is not limited in the embodiments of the present disclosure.

A wireless connection can be established between the base station 12 and the terminal 11 through a wireless radio. In different embodiments, the wireless radio is a wireless radio based on the $4^{th}$ generation mobile communication network technology (4G) standard. Alternatively, the wireless radio is a wireless radio based on the $5^{th}$ generation mobile communication network technology (5G) standard. For example, the wireless radio is a new radio. Alternatively, the wireless radio can also be a wireless radio based on the next generation mobile communication network technology standard of the 5G.

In some embodiments, an end to end (E2E) connection may also be established between the terminals 11, for example, a vehicle to vehicle (V2V) communication, a vehicle to infrastructure (V2I) communication and a vehicle to pedestrian (V2P) communication in a vehicle to everything (V2X) communication.

In some embodiments, the wireless communication system may further include a network management device 13.

Several base stations 12 are connected to the network management device 13, respectively. The network management device 13 may be a core network device in the wireless communication system, for example, the network management device 13 may be a mobility management entity (MME) in an evolved packet core (EPC). Alternatively, the network management device may be other core network devices, such as a serving gateway (SGW), a public data network gateway (PGW), a policy and charging rules function (PCRF) or a home subscriber server (HSS). The implementation form of the network management device 13 is not limited in the embodiment of the present disclosure.

Executors involved in embodiments of the present disclosed include, but are not limited to, a user equipment (UE) in a cellular mobile communication system, a base station of the cellular mobile communication, etc.

FIG. 2 is a flow chart showing a network data collection method according to an illustrative embodiment. As shown in FIG. 2, the network data collection method in embodiments of the present disclosure includes the following processing steps.

In step 201, first indication information is sent by a network device.

The first indication information is configured to indicate a UE to record network data.

In an embodiment of the present disclosure, sending, by the network device, the first indication information may be as follows.

The first indication information is born in a paging message by the network device, and the first indication information is sent through the paging message by the network device. That is, when the network device initiates paging to the UE, the first indication information is notified to the UE through the paging message sent to the UE. Here, the first indication information is configured to indicate the UE to record the received network information so as to report the recorded network data to the network device. After receiving the first indication information based on the paging message, the UE records related parameters of the network so as to report the recorded network data to the network device at any time. Here, as soon as the UE receives the first indication information, it starts to record related network data.

As another implementation, identification information of the UE and the first indication information are born in the paging message by the network device, and the first indication information and the identification of the UE are sent to the UE through the paging message when paging the UE. The UE records the network data based on the first indication information in the paging message. Here, the UE determines that the network device initiates the paging for itself based on the identification of the UE in the paging message.

As another implementation, the first indication information is born in a radio resource control (RRC) message by the network device, and the first indication information is sent through the RRC message by the network device.

Alternatively, when the first indication information is sent to the UE through the RRC message by the network device, area information of the network data to be collected is also born in the RRC message by the network device. That is, when the network device sends the first indication information to indicate the UE to collect and record the network data, the area information of the network data to be collected is also notified to the UE. The UE records the network data when entering an area where network data to be collected is located, and the network data is no longer recorded after the UE leaves the area where network data to be collected is located. In this case, the network side needs network data in a specific area, so that more UEs can collect and report network data in a designated area, so as to make network planning and related resource configuration based on the network data in the specific area.

Alternatively, as another implementation, area information and a recording period of the network data to be collected are born in the RRC message by the network device. The area information and the recording period of the network data to be collected can be sent to the UE by the network device according to the actual needs, so that the UE records the network data according to the set recording period when entering the area where the network data to be collected is located.

In an embodiment of the present disclosure, the area information includes cell list information, and/or coordinate information of a geographical range. In other words, when entering a certain cell, the UE can determine, based on the received cell list information, whether the cell is a cell in the cell list where network data needs to be recorded according to the identification information of the current cell, and if yes, network data is recorded in the cell. Alternatively, after performing locating according to a reference signal sent by the network side and determining its own position, the UE determines whether the UE is currently within a geographical range of network data recording, and when it is located in the geographical range indicated by the network device, the UE starts to record the network data.

In an embodiment of the present disclosure, on the basis of the network data collection method shown in FIG. 1, the method further includes sending, by the network device, second indication information; in which the second indication information is configured to indicate network data collection capability information of the network device. Specifically, the second indication information is born in a system broadcast message by the network device, and the second indication information is sent through the system broadcast message by the network device.

In an embodiment of the present disclosure, the network device can broadcast to the UE whether it is capable of collecting the network data through the system broadcast message. If the network device is capable of collecting the network data, the UE can report the recorded network data to the network device according to an instruction of the network device after recording the corresponding network data, or actively initiate a request for network data reporting to the network device and report the network data on a designated uplink resource after being confirmed by the network device. In a mobile network, some network devices, such as base stations, may not have the network data collection capability in the embodiment of the present disclosure. At this time, if the UE reports its own recorded network data to such network devices, such as base stations, the network devices, such as base stations, may not be able to process these network data. Certainly, these network devices themselves may not be able to allocate corresponding resources to the UE to enable the UE to report the network data.

In an embodiment of the present disclosure, on the basis of the network data collection method shown in FIG. 1, the method further includes sending, by the network device, third indication information to the UE through an RRC message; in which the third indication information is configured to indicate the UE to report the network data recorded by the UE.

In an embodiment of the present disclosure, the network device sends the third indication information to the UE through an RRC message, and actively instructs the UE to report the network data recorded by the UE to the network device. At this time, the network device can allocate the corresponding uplink resource to the UE, and the UE reports the network data in the uplink resource according to an instruction of the network device.

In an embodiment of the present disclosure, on the basis of the network data collection method shown in FIG. 1, the method further includes receiving, by the network device, fourth indication information sent by the UE, in which the fourth indication information is configured to indicate whether the network data recorded is stored in the UE.

In an embodiment of the present disclosure, the UE may also actively send the fourth indication information to the network device, which notifies the network device that the network data has been stored in itself and can be reported to the network side.

In an embodiment of the present disclosure, the network data includes at least one of a movement state of the UE, a residence duration of the UE in a cell, a radio channel quality, a resident/serving cell identifier, a geographical location coordinate, an electric quantity of the UE, computing power information of the UE, whether the UE is in an access prohibition state, and an RRC state.

In an embodiment of the present disclosure, the network device includes a network access device such as a base station, a relay station, a radio remote unit, etc., and can also be a satellite station or a ground device. It should be understood by those skilled in the art that all network devices capable of establishing a radio connection with the UE can realize the collection of the network data in the embodiment of the present disclosure.

FIG. 3 is a flow chart showing a network data collection method according to an illustrative embodiment. As shown in FIG. 3, the network data collection method in an embodiment of the present disclosure includes the following processing steps.

In step 301, the first indication information sent by the network device is received by a UE.

The first indication information is configured to indicate the UE to record network data.

In an embodiment of the present disclosure, the UE receives the first indication information sent by the network device, so as to record the network data according to the first indication information.

Specifically, the first indication information is received by the UE through a paging message or an RRC message sent by the network device.

In an embodiment, the first indication information is received by the UE through the paging message; and the network data is recorded by the UE based on identification information of the UE and information for indicating the UE to record the network data contained in the first indication information.

Alternatively, as another implementation, the first indication information is received by the UE through the RRC message; and the network data is recorded by the UE based on area information contained in the first indication information or on area information and a recording period contained in the first indication information.

In an embodiment of the present disclosure, the area information includes cell list information, and/or coordinate information of a geographical range.

In step 302, network data is recorded by the UE based on the first indication information.

Specifically, the network data can be recorded in a set area according to a specific instruction of the first indication information of the network device. Alternatively, the network data is recorded according to a recording area and the recording period in the first indication information. If there is no indication related to network data recording in the first indication information, the network data can be recorded by the UE based on its own configuration. For example, the network device can notify the UE of the recording period of the network data in advance through a system broadcast message, and the UE performs a configuration of the recording period of the network data locally based on the system broadcast message. Alternatively, the recording period of the network data is configured in the UE in advance, for example, the recording period is configured before the UE leaves the factory.

On the basis of the network data collection method shown in FIG. 3, the network data collection method in the example further includes receiving, by the UE, second indication information sent by the network device; and reporting, by the UE, the network data recorded by the UE to the network device in response to the second indication information, when the network device is capable of collecting the network data; in which the second indication information is configured to indicate network data collection capability information of the network device. Specifically, the network device may broadcast the second indication information to the UE through the system broadcast message sent by itself. That is, the second indication information is born in the system broadcast message and broadcasted to the UE by the network device.

In an embodiment of the present disclosure, the network device may also send information indicating whether it is capable of collecting the network data to the UE. In a mobile network, some network devices, such as base stations, may not have the network data collection capability in the embodiment of the present disclosure. At this time, if the UE reports its own recorded network data to such network devices, such as base stations, the network devices, such as base stations, may not be able to process these network data. Certainly, these network devices themselves may not be able to allocate corresponding resources to the UE to enable the UE to report the network data.

On the basis of the network data collection method shown in FIG. 3, the network data collection method in the example further includes receiving, by the UE, third indication information through an RRC message sent by the network device; and reporting, by the UE, the network data recorded by the UE to the network device in response to the third indication information; in which the third indication information is configured to indicate the UE to report the network data recorded by the UE.

The network device can notify the UE to report network data by sending the RRC message to the UE, that is, the network device can actively send corresponding notification information to the UE, so that the UE can report the recorded network data. Certainly, the reporting period of network data can also be set for the UE as needed. The UE reports its own recorded network data to the network device when the reporting period comes according to the configured reporting period of network data. Certainly, this way of configuring the reporting period of network data for the UE may lead to the situation that the corresponding network data is lost when the UE is connected to the network device that is not capable of collecting the network data. However, in this way of configuring the reporting period, the network device does not need to send the third indication information to the UE, which is beneficial to the saving of communication resources between the network device and the UE.

On the basis of the network data collection method shown in FIG. 3, the network data collection method in the example further includes determining that the network device is capable of collecting the network data and locally has the network data recorded when the UE enters a connected state; bearing fourth indication information in the RRC message sent to the network device, in which the fourth indication information is configured to indicate that the UE has the network data recorded.

In an embodiment of the present disclosure, when the UE enters the connected state, when it is determined that the network device is capable of collecting the network data, the UE can send the fourth indication information to the network device to notify the network device of the situation of the network data recorded by itself, that is, the UE can send the corresponding indication information to the network device to notify the network device that the UE has the recorded network data, so that the network data can be reported to the network device at any time.

In an embodiment of the present disclosure, the RRC message sent by the UE to the network device includes one of: an RRC connection establishment complete message, an RRC recovery complete message, and an RRC re-establishment complete message.

In an embodiment of the present disclosure, the network data includes at least one of: a movement state of the UE, a residence duration of the UE in a cell, a radio channel quality, a resident/serving cell identifier, a geographical location coordinate, an electric quantity of the UE, computing power information of the UE, whether the UE is in an access prohibition state, and an RRC state.

In an embodiment of the present disclosure, the UE records the network data according to the instruction of the first indication information, and reports the network data after receiving a reporting instruction sent by the network device. Because UEs are distributed in spaces in a network, and communication links established between UEs and the network device are completely different, that is, communication environments of the UEs are different, so that after a large amount of UEs record and report the network data, the reported network data is data in an actual communication scenario, and each is also representative. The network side can analyze these network data based on the network data reported by the UE, and based on an artificial intelligence algorithm and a neural network technology, etc., so as to determine the communication performance and existing communication deficiencies of the network, and perform corresponding optimization on the network, so that better network planning and configuration can be provided, better business service quality can be provided for a user, and the use experience of the mobile network of the user is improved.

Figure 4:
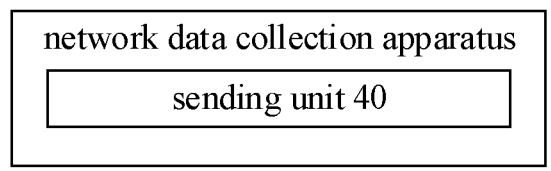
FIG. 4 is a schematic diagram showing a network data collection apparatus in a network device according to an illustrative embodiment.

FIG. 4 is a schematic diagram showing a network data collection apparatus according to an illustrative embodiment. As shown in FIG. 4, the network data collection apparatus in an embodiment of the present disclosure includes a sending unit 40 configured to send first indication information; in which the first indication information is configured to indicate a user equipment (UE) to record network data.

In an embodiment, the sending unit 40 is further configured to bear the first indication information in a paging message, and send the first indication information through the paging message.

In an embodiment, the sending unit 40 is further configured to bear identification information of the UE and the first indication information in the paging message.

In an embodiment, the sending unit 40 is further configured to bear the first indication information in an RRC message, and send the first indication information through the RRC message.

In an embodiment, the sending unit 40 is further configured to bear area information of the network data to be collected in the RRC message.

In an embodiment, the sending unit 40 is further configured to bear area information and a recording period of the network data to be collected in the RRC message.

In an embodiment, the area information includes cell list information, and/or coordinate information of a geographical range.

In an embodiment, the sending unit 40 is further configured to send second indication information; in which the second indication information is configured to indicate network data collection capability information of the network device.

In an embodiment, the sending unit 40 is further configured to bear the second indication information in a system broadcast message, and send the second indication information through the system broadcast message.

In an embodiment, the sending unit 40 is further configured to send third indication information to the UE through an RRC message; in which the third indication information is configured to indicate the UE to report the network data recorded by the UE.

On the basis of the network data collection apparatus shown in FIG. 4, the network data collection apparatus in an embodiment of the present disclosure further includes a receiving unit (not shown in FIG. 4) configured to receive fourth indication information sent by the UE, in which the fourth indication information is configured to indicate whether the network data recorded is stored in the UE.

In an embodiment, the network data includes at least one of: a movement state of the UE, a residence duration of the UE in a cell, a radio channel quality, a resident/serving cell identifier, a geographical location coordinate, an electric quantity of the UE, computing power information of the UE, whether the UE is in an access prohibition state, and an RRC state.

In an illustrative embodiment, the sending unit 40, the receiving unit, etc. can be implemented by one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate arrays (FPGAs), general-purpose processors, controllers, micro controller units (MCUs), microprocessors, or other electronic elements, and can also be implemented in combination with one or more radio frequency (RF) antennas, which are configured to execute the steps of the network data collection method in the previous embodiments.

In the embodiment of the present disclosure, with respect to the network data collection apparatus shown in FIG. 4, the specific manners for performing operations for individual modules and units therein have been described in detail in the embodiments regarding the methods, which will not be elaborated herein.

Figure 5:
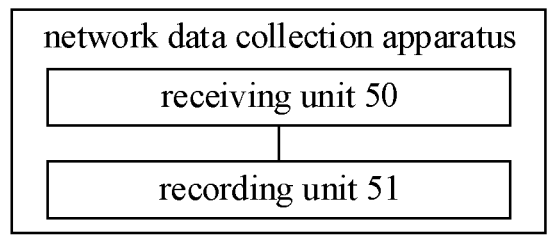
FIG. 5 is a schematic diagram showing a network data collection apparatus in a user equipment according to an illustrative embodiment.

FIG. 5 is a schematic diagram showing a network data collection apparatus according to an illustrative embodiment. As shown in FIG. 5, the network data collection apparatus in the embodiment of the present disclosure includes a receiving unit 50 configured to receive first indication information sent by a network device; and a recording unit 51 configured to record network data based on the first indication information; in which the first indication information is configured to indicate to record network data.

In an embodiment, the receiving unit 50 is further configured to receive the first indication information through a paging message or an RRC message sent by the network device.

In an embodiment, the receiving unit 50 is further configured to receive the first indication information through the paging message; and the recording unit 51 is further configured to record the network data based on identification information of the UE and an instruction for recording the network data contained in the first indication information.

In an embodiment, the receiving unit 50 is further configured to receive the first indication information through the RRC message; and the recording unit 51 is further configured to record the network data based on area information contained in the first indication information or on area information and a recording period contained in the first indication information.

In an embodiment, the area information includes cell list information, and/or coordinate information of a geographical range.

On the basis of the network data collection apparatus shown in FIG. 5, the network data collection apparatus in the embodiment of the present disclosure further includes a reporting unit (not shown in FIG. 5). The receiving unit 50 is further configured to receive second indication information sent by the network device. The reporting unit is configured to report the network data recorded by the recording unit 51 to the network device in response to the second indication information when the network device is capable of collecting the network data. The second indication information is configured to indicate network data collection capability information of the network device.

In an embodiment, the receiving unit 50 is further configured to receive the second indication information through a system broadcast message sent by the network device.

In an embodiment, the receiving unit 50 is further configured to receive third indication information through an RRC message sent by the network device; and the reporting unit is further configured to report the network data recorded by the recording unit to the network device in response to the third indication information; in which the third indication information is configured to indicate to report the network data recorded by the recording unit.

On the basis of the network data collection apparatus shown in FIG. 5, the network data collection apparatus in an embodiment of the present disclosure further includes a determining unit (not shown in FIG. 5) configured to determine whether the network device is capable of collecting the network data when a connected state is entered, determine whether the network data is recorded locally when the network device is capable of collecting the network data, and trigger the reporting unit to send an RRC message to the network device when the network data is recorded; the RRC message bearing fourth indication information, and the fourth indication information being configured to indicate that the recording unit has the network data recorded.

In an embodiment, the network data includes at least one of: a movement state of the UE, a residence duration of the UE in a cell, a radio channel quality, a resident/serving cell identifier, a geographical location coordinate, an electric quantity of the UE, computing power information of the UE, whether the UE is in an access prohibition state, and an RRC state.

In an illustrative embodiment, the receiving unit 50, the recording unit 51, the reporting unit, the determining unit, etc. can be implemented by one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate arrays (FPGAs), general-purpose processors, controllers, micro controller units (MCUs), microprocessors, or other electronic elements, and can also be implemented in combination with one or more radio frequency (RF) antennas, which are configured to execute the steps of the network data collection method in the previous embodiments.

In the embodiment of the present disclosure, with respect to the network data collection apparatus shown in FIG. 5, the specific manners for performing operations for individual modules and units therein have been described in detail in the embodiments regarding the methods, which will not be elaborated herein.

Figure 6:
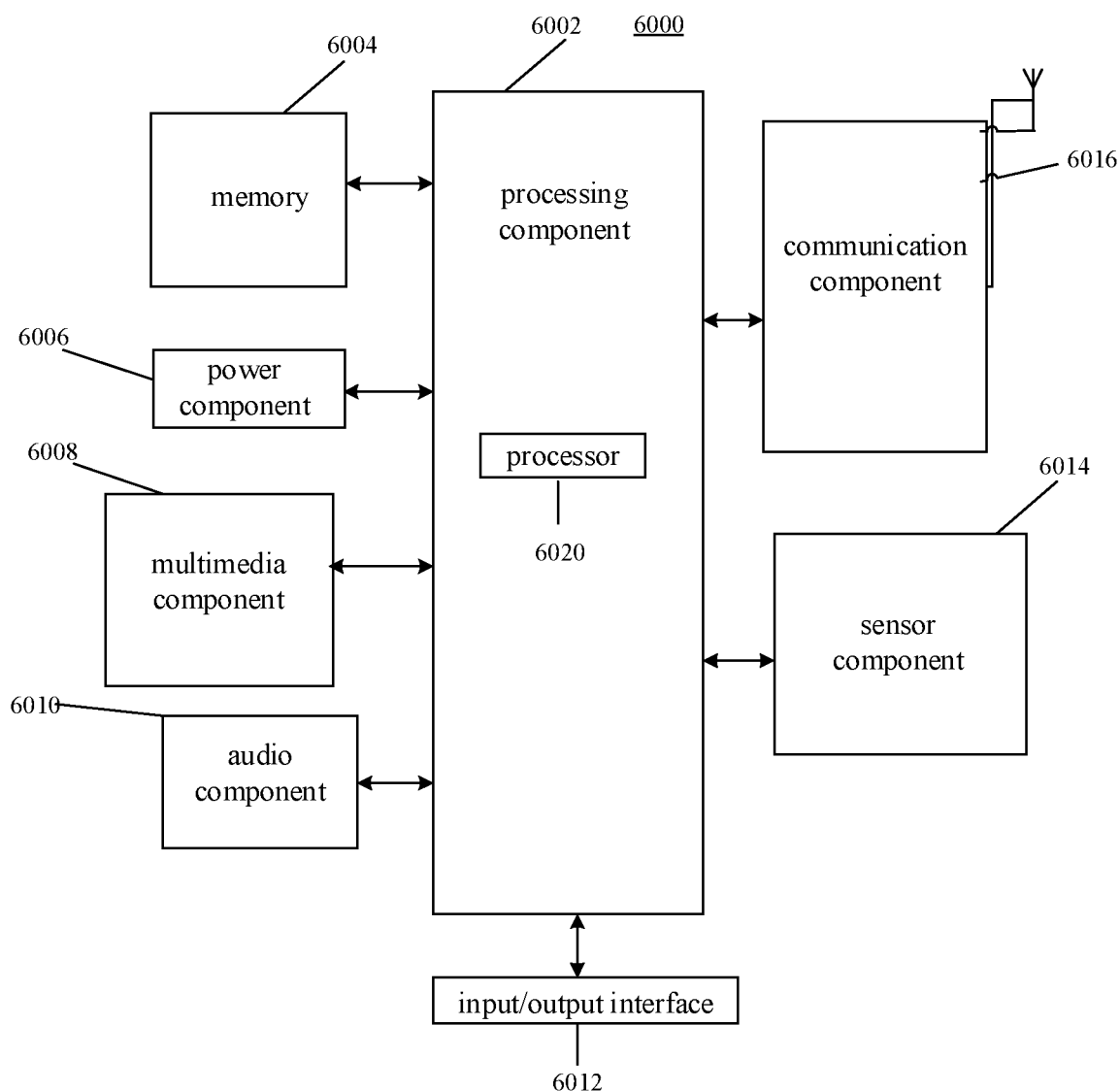
FIG. 6 is a schematic diagram showing a user equipment according to an illustrative embodiment.

FIG. 6 is a block diagram showing a user equipment 6000 according to an illustrative embodiment. For example, the user equipment 6000 can be a mobile phone, a computer, a digital broadcast terminal, a messaging device, a game console, a tablet device, a medical device, a fitness device, a personal digital assistant, or the like.

Referring to FIG. 6, the user equipment 6000 may include one or more of the following components: a processing component 6002, a memory 6004, a power component 6006, a multimedia component 6008, an audio component 6010, an input/output (I/O) interface 6012, a sensor component 6014, and a communication component 6016.

The processing component 6002 typically controls overall operations of the user equipment 6000, such as the operations associated with display, phone calls, data communications, camera operations, and recording operations. The processing component 6002 can include one or more processors 6020 to execute instructions to perform all or some of the steps in the above-described methods. Moreover, the processing component 6002 may include one or more modules which facilitate the interaction between the processing component 6002 and other components. For instance, the processing component 6002 may include a multimedia module to facilitate the interaction between the multimedia component 6008 and the processing component 6002.

The memory 6004 is configured to store various types of data to support the operation of the user equipment 6000. Examples of such data include instructions for any applications or methods operated on the user equipment 6000, contact data, phonebook data, messages, pictures, videos, etc. The memory 6004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 6006 provides power to various components of the user equipment 6000. The power component 6006 may include a power management system, one or more power sources, and any other components associated with the generation, management, and distribution of power in the user equipment 6000.

The multimedia component 6008 includes a screen providing an output interface between the user equipment 6000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 6008 includes a front camera and/or a rear camera. The front camera and/or the rear camera may receive an external multimedia datum while the user equipment 6000 is in an operation mode, such as a photographing mode or a video mode. Each of the front camera and the rear camera may be a fixed optical lens system or have focus and optical zoom capability.

The audio component 6010 is configured to output and/or input audio signals. For example, the audio component 6010 includes a microphone (MIC) configured to receive an external audio signal when the user equipment 6000 is in an operation mode, such as a call mode, a recording mode, and a voice recognition mode. The received audio signal may be further stored in the memory 6004 or transmitted via the communication component 6016. In some embodiments, the audio component 6010 further includes a speaker to output audio signals.

The I/O interface 6012 provides an interface between the processing component 6002 and peripheral interface modules, such as keyboards, click wheels, buttons, and the like. The buttons may include, but are not limited to, a home button, a volume button, a starting button, and a locking button.

The sensor component 6014 includes one or more sensors to provide status assessments of various aspects of the user equipment 6000. For instance, the sensor component 6014 may detect an open/closed status of the user equipment 6000, relative positioning of components, e.g., the display and the keypad, of the user equipment 6000, a change in position of the user equipment 6000 or an component of the user equipment 6000, a presence or absence of user contact with the user equipment 6000, an orientation or an acceleration/deceleration of the user equipment 6000, and a change in temperature of the user equipment 6000. The sensor component 6014 may include a proximity sensor configured to detect the presence of nearby objects without any physical contact. The sensor component 6014 may include a light sensor, such as a CMOS or CCD image sensor, for use in imaging applications. In some embodiments, the sensor component 6014 may further include an accelerometer sensor, a gyroscope sensor, a magnetic sensor, a pressure sensor, or a temperature sensor.

The communication component 6016 is configured to facilitate communication, wired or wireless, between the user equipment 6000 and other devices. The user equipment 6000 can access a wireless network based on a communication standard, such as Wi-Fi, 2G, or 3G, or a combination thereof. In an illustrative embodiment, the communication component 6016 receives a broadcast signal or broadcast associated information from an external broadcast management system via a broadcast channel. In an illustrative embodiment, the communication component 6016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the user equipment 6000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing steps of the network data collection method in the above-mentioned embodiments.

In an illustrative embodiment, there is also provided a non-transitory computer readable storage medium including instructions, such as included in the memory 6004, executable by the processor 6020 in the user equipment 6000, for completing the above-mentioned network data collection method. For example, the non-transitory computer-readable storage medium may be a ROM, a random access memory (RAM), a CD-ROM, a magnetic tape, a floppy disc, an optical data storage device, and the like.

In an illustrative embodiment, there is also described a network device, which includes a processor, a transceiver, a memory and an executable program stored in the memory and capable of being run by the processor, in which the processor is configured to execute steps of the network data collection method when running the executable program. In an embodiment of the present disclosure, the network device includes a network access device such as a base station, a relay station, a radio remote unit, etc., and can also be a satellite station or a ground device.

Other embodiments of the present disclosure will be apparent to those skilled in the art from consideration of the specification and practice of the present disclosure described here. The present disclosure is intended to cover any variations, uses, or adaptations of the embodiments of the present disclosure following the general principles thereof and including such departures from the embodiments of the present disclosure as come within known or customary practice in the art. It is intended that the specification and examples be considered as exemplary only, with a true scope and spirit of the embodiments of the present disclosure being indicated by the following claims.

It will be appreciated that the embodiments of the present disclosure are not limited to the exact construction that has been described above and illustrated in the accompanying drawings, and that various modifications and changes can be made without departing from the scope thereof. It is intended that the scope of the embodiments of the present disclosure only be limited by the appended claims.

The invention claimed is:

1. A network data collection method, comprising:
sending, by a network device, first indication information;
wherein the first indication information is configured to indicate a user equipment (UE) to record network data;
wherein sending, by the network device, the first indication information comprises:
bearing, by the network device, the first indication information in a paging message, and sending, by the network device, the first indication information through the paging message; or
bearing, by the network device, the first indication information in a radio resource control (RRC) message, and sending, by the network device, the first indication information through the RRC message.

2. The method of claim 1, wherein bearing, by the network device, the first indication information in the paging message comprises:
bearing, by the network device, identification information of the UE and the first indication information in the paging message.

3. The method of claim 1, further comprising:
bearing, by the network device, area information of the network data to be collected in the RRC message.

4. The method of claim 3, wherein the area information comprises:
cell list information, and/or coordinate information of a geographical range.

5. The method of claim 1, further comprising:
bearing, by the network device, area information and a recording period of the network data to be collected in the RRC message.

6. The method of claim 1, further comprising:
sending, by the network device, second indication information;
wherein the second indication information is configured to indicate network data collection capability information of the network device.

7. The method of claim 6, wherein sending the second indication information by the network device comprises:
bearing, by the network device, the second indication information in a system broadcast message, and
sending, by the network device, the second indication information through the system broadcast message.

8. The method of claim 6, further comprising:
receiving, by the network device, fourth indication information sent by the UE,
wherein the fourth indication information is configured to indicate whether the network data recorded is stored in the UE.

9. The method of claim 1, further comprising:
sending, by the network device, third indication information to the UE through the RRC message;
wherein the third indication information is configured to indicate the UE to report the network data recorded by the UE.

10. The method of claim 1, wherein the network data comprises at least one of:
a movement state of the UE, a residence duration of the UE in a cell, a radio channel quality, a resident/serving cell identifier, a geographical location coordinate, an electric quantity of the UE, computing power information of the UE, whether the UE is in an access prohibition state, and an RRC state.

11. A network data collection method, comprising:
receiving, by a user equipment (UE), first indication information sent by a network device; and
recording, by the UE, network data based on the first indication information;
receiving, by the UE, the first indication information through a paging message or an RRC message sent by the network device.

12. The method of claim 11, wherein recording the network data based on the first indication information comprises:
receiving, by the UE, the first indication information through the paging message; and
recording, by the UE, the network data based on identification information of the UE and information for indicating the UE to record the network data contained in the first indication information.

13. The method of claim 11, wherein recording the network data based on the first indication information comprises:
receiving, by the UE, the first indication information through the RRC message; and
recording, by the UE, the network data based on area information contained in the first indication information or on area information and a recording period contained in the first indication information.

14. The method of claim 11, further comprising:
receiving, by the UE, second indication information sent by the network device; and
reporting, by the UE, the network data recorded by the UE to the network device in response to the second indication information, when the network device is capable of collecting the network data;
wherein the second indication information is configured to indicate network data collection capability information of the network device.

15. The method of claim 14, wherein receiving, by the UE, the second indication information sent by the network device comprises:
receiving, by the UE, the second indication information through a system broadcast message sent by the network device.

16. The method of claim 14, further comprising:
determining that the network device is capable of collecting the network data and locally has the network data recorded when the UE enters a connected state;
bearing fourth instruction information in the RRC message sent to the network device,
wherein the fourth instruction information is configured to indicate that the UE has the network data recorded.

17. The method of claim 11, further comprising:
receiving, by the UE, third indication information through the RRC message sent by the network device; and
reporting, by the UE, the network data recorded by the UE to the network device in response to the third indication information;
wherein the third indication information is configured to indicate the UE to report the network data recorded by the UE.

18. The method of claim 11, wherein the network data comprises at least one of
a movement state of the UE, a residence duration of the UE in a cell, a radio channel quality, a resident/serving cell identifier, a geographical location coordinate, an electric quantity of the UE, computing power information of the UE, whether the UE is in an access prohibition state, and an RRC state.

19. A network device, comprising:
a processor;
a transceiver;
a memory; and
an executable program stored in the memory and capable of being run by the processor,
wherein the processor is configured to send first indication information,
wherein the first indication information is configured to indicate a user equipment (UE) to record network data;
wherein the processor is further configured to:
bear the first indication information in a paging message, and send the first indication information through the paging message; or
bear the first indication information in a radio resource control (RRC) message, and send the first indication information through the RRC message.

20. A user equipment, comprising:
a processor;
a transceiver;
a memory; and
an executable program stored in the memory and capable of being run by the processor,
wherein the processor is configured to perform the method of claim 11.

* * * * *